(12) United States Patent
Noguchi et al.

(10) Patent No.: US 11,933,401 B2
(45) Date of Patent: Mar. 19, 2024

(54) PLUNGER, INSTRUMENT, AND MOLD

(71) Applicant: Enplas Corporation, Saitama (JP)

(72) Inventors: Koji Noguchi, Saitama (JP); Shigeru Uemura, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/495,860

(22) Filed: Oct. 7, 2021

(65) Prior Publication Data

US 2022/0112951 A1   Apr. 14, 2022

(30) Foreign Application Priority Data

Oct. 9, 2020 (JP) .................................. 2020-171388
Dec. 28, 2020 (JP) .................................. 2020-219093
Mar. 2, 2021 (JP) .................................. 2021-032532

(51) Int. Cl.
*F16J 1/00* (2006.01)
*B29C 45/26* (2006.01)

(52) U.S. Cl.
CPC ............. *F16J 1/005* (2013.01); *B29C 45/261* (2013.01)

(58) Field of Classification Search
CPC ........ F16J 1/005; F16J 1/12; F16J 1/01; F16J 1/10
See application file for complete search history.

(56) References Cited

U.S. PATENT DOCUMENTS

| | | | | |
|---|---|---|---|---|
| 4,500,310 A | * | 2/1985 | Christinger | A61M 5/31513 604/230 |
| 4,997,423 A | * | 3/1991 | Okuda | A61M 5/2429 604/218 |
| 5,009,646 A | * | 4/1991 | Sudo | A61M 5/31513 604/230 |
| 5,222,942 A | * | 6/1993 | Bader | A61B 5/153 604/218 |
| 5,411,488 A | * | 5/1995 | Pagay | A61M 5/31513 604/218 |
| 5,785,683 A | * | 7/1998 | Szapiro | A61M 5/284 604/228 |
| 5,928,202 A | * | 7/1999 | Linnebjerg | A61M 5/31511 604/218 |
| 8,474,656 B2 | * | 7/2013 | Kunishi | A61C 5/62 222/326 |

(Continued)

FOREIGN PATENT DOCUMENTS

JP   2013-517095   5/2013

*Primary Examiner* — Grant Moubry (57) ABSTRACT

Provided is a plunger including: a plunger body; a first surface configured to come into contact with an inner peripheral surface of the cylindrical member; a second surface disposed on a base end side relative to the first surface, the second surface having an outer diameter that is smaller than that of the first surface; an outer stepped surface disposed between the first surface and the second surface; a first housing disposed in an area at least partly corresponding to the second surface in the recess, the first housing being provided for housing a tip part of the pin; a second housing disposed on the base end side relative to the first housing, the second housing having an inner diameter that is smaller than a largest inner diameter of the first housing; and an inner stepped surface disposed between the first housing and the second housing.

9 Claims, 9 Drawing Sheets

(56) References Cited

U.S. PATENT DOCUMENTS

| | | | |
|---|---|---|---|
| 8,475,415 B2* | 7/2013 | Schiller | A61M 5/31513 |
| | | | 604/218 |
| 9,850,445 B2* | 12/2017 | Minagawa | B60C 11/00 |
| 2003/0097096 A1* | 5/2003 | Niedospial, Jr. | A61M 5/3129 |
| | | | 604/218 |
| 2006/0178643 A1* | 8/2006 | Sudo | A61M 5/31511 |
| | | | 604/230 |
| 2011/0178463 A1 | 7/2011 | Cabiri | |
| 2013/0123712 A1* | 5/2013 | Ivosevic | A61M 5/31511 |
| | | | 604/218 |
| 2014/0062036 A1* | 3/2014 | Maeda | A61M 5/31511 |
| | | | 277/615 |
| 2014/0288509 A1* | 9/2014 | Altmeyer | A61M 5/31513 |
| | | | 604/222 |
| 2015/0119817 A1* | 4/2015 | Prasad | A61M 5/31513 |
| | | | 525/240 |
| 2019/0125976 A1* | 5/2019 | Lilly | A61F 9/0008 |
| 2021/0038823 A1* | 2/2021 | Ryan | A61M 5/31501 |
| 2021/0213301 A1* | 7/2021 | Akerele-Ale | A61M 25/0071 |

* cited by examiner

PLUNGER, INSTRUMENT, AND MOLD

CROSS REFERENCE TO RELATED APPLICATIONS

This application is entitled to the benefit of Japanese Patent Applications No. 2020-171388, filed on Oct. 9, 2020, Japanese Patent Application No. 2020-219093, filed on Dec. 28, 2020, and Japanese Patent Application No. 2021-032532, filed on Mar. 2, 2021, the disclosures of which including the specification, drawings and abstract are incorporated herein by reference in their entireties.

TECHNICAL FIELD

The present invention relates to a plunger, an instrument, and a mold.

BACKGROUND ART

Plungers, which slide with respect to inner walls of cylindrical members, are generally used for discharging fluid such as gas or liquid filled inside the cylindrical members into the outside or for suctioning the fluid into the cylindrical members (e.g., see Patent Literature (hereinafter, referred to as "PTL") 1).

PTL 1 describes a cartridge interface assembly for pushing liquid in a cartridge by sliding a plunger with respect to a cylindrical cartridge. The plunger described in PTL 1 is made of, for example, natural or synthetic rubber.

CITATION LIST

Patent Literature

PTL 1
Japanese Unexamined Patent Application Publication (Translation of PCT Application) No. 2013-517095

SUMMARY OF INVENTION

Technical Problem

However, since the plunger described in PTL 1 is made of rubber, mass-production thereof is difficult; the plunger is expensive and takes a long time for producing. As a means for solving these problems, it is conceivable to produce a plunger from a resin such as an elastomer. However, a plunger made of resin involves a functional problem although it is inexpensive. Specifically, a resin plunger is hard, so that it may be squeezed when forming a large undercut shape such as an oil groove. In addition, when forming a large undercut shape such as an oil groove, the resin plunger may have a secant mark in a direction perpendicular to a circumferential direction, and thus, seal performance may be reduced. Improving the seal performance requires post-processing. Moreover, the resin plunger is hard, so that it will be plastically deformed when being forcibly pulled out, and the oil groove cannot be formed. As a result, an operation failure due to oil shortage and/or a shape defect due to friction occurs. Furthermore, the resin plunger may be plastically deformed or be changed in shape with time when a large stress is continuously applied thereto; thus, for example, in a case where the plunger is stored for a long period before use, a contact pressure thereof may be reduced during use.

Accordingly, an object of the present invention is to provide a resin plunger which is inexpensive and functionally stable. Another object of the present invention is to provide an instrument having the above plunger. Yet another object of the present invention is to provide a mold for producing the above plunger.

Solution to Problem

A plunger according to an embodiment of the present invention is configured to be attached to a tip of a pin and to slide inside of a cylindrical member, the plunger including: a plunger body made of a resin and including a recess that opens at a base end, the recess being provided for inserting a part of the pin; a first surface disposed on an outer peripheral surface of the plunger body and configured to come into contact with an inner peripheral surface of the cylindrical member; a second surface disposed on a base end side relative to the first surface in the outer peripheral surface of the plunger body, the second surface having an outer diameter that is smaller than that of the first surface; an outer stepped surface disposed between the first surface and the second surface in the outer peripheral surface of the plunger body; a first housing disposed in an area at least partly corresponding to the second surface in the recess, the first housing being provided for housing a tip part of the pin; a second housing disposed on the base end side relative to the first housing in the recess, the second housing having an inner diameter that is smaller than a largest inner diameter of the first housing; and an inner stepped surface disposed between the first housing and the second housing in the recess.

An instrument according to an embodiment of the present invention is for injecting or suctioning a fluid, the instrument including: a cylindrical member; and a plunger configured to be attached to a tip of a pin and to slide inside of the cylindrical member, wherein the plunger includes a plunger body made of a resin and including a recess that is open at a base end, the recess being provided for inserting a part of the pin, and an outer diameter of a part of the plunger body increases when the part of the pin is inserted into the recess.

A mold according to an embodiment of the present invention is for molding a plunger of the present invention, the mold including: a first mold for molding the recess; a second mold for molding a distal-end-side portion of the outer peripheral surface; a third mold for molding a base-end-side portion of the outer peripheral surface; and a fourth mold for molding a base end surface of the plunger.

Advantageous Effects of Invention

According to the present invention, it is possible to provide a plunger which is inexpensive and functionally stable, and an instrument.

DESCRIPTION OF EMBODIMENTS

Hereinafter, an instrument according to embodiments of the present invention will be described with reference to the accompanying drawings.

Embodiment 1

(Configurations of Instrument and Plunger)

Figure 1:
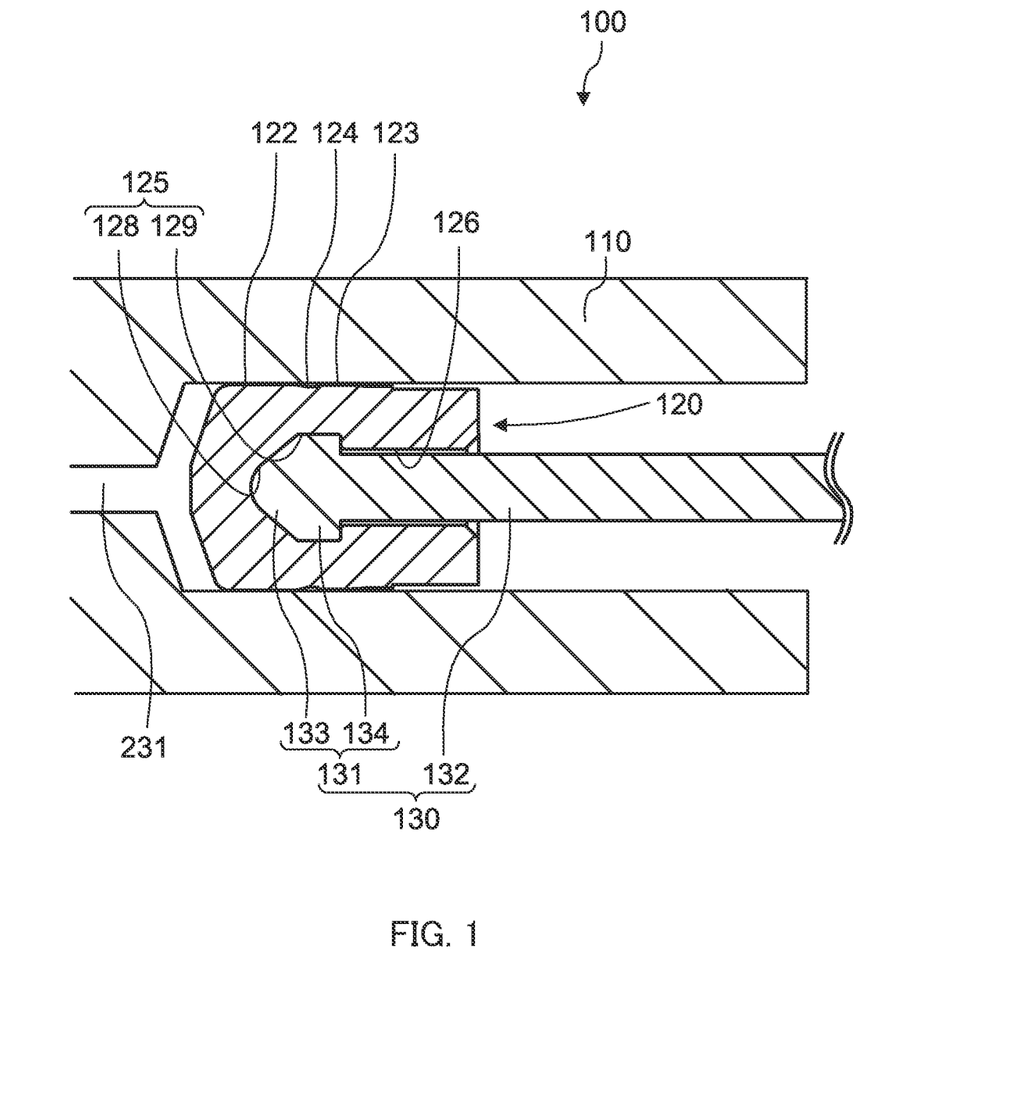
FIG. 1 is a cross-sectional view of a configuration of an instrument according to Embodiment 1 of the present invention.
Figure 2A:
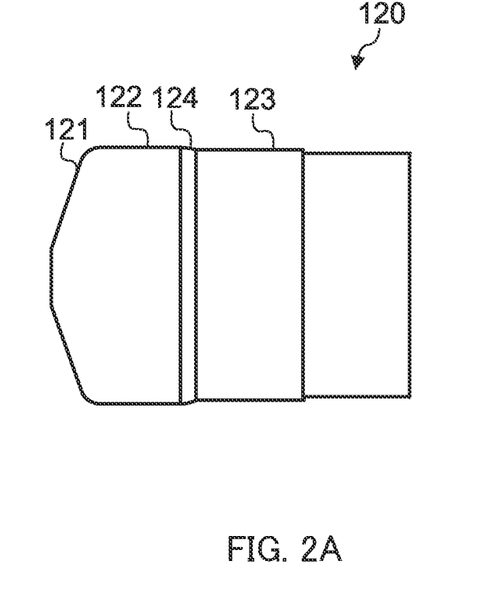
FIGS. 2A, 2B, 2C and 2D illustrate a configuration of a plunger according to Embodiment 1 of the present invention.
Figures 2B, 2D:
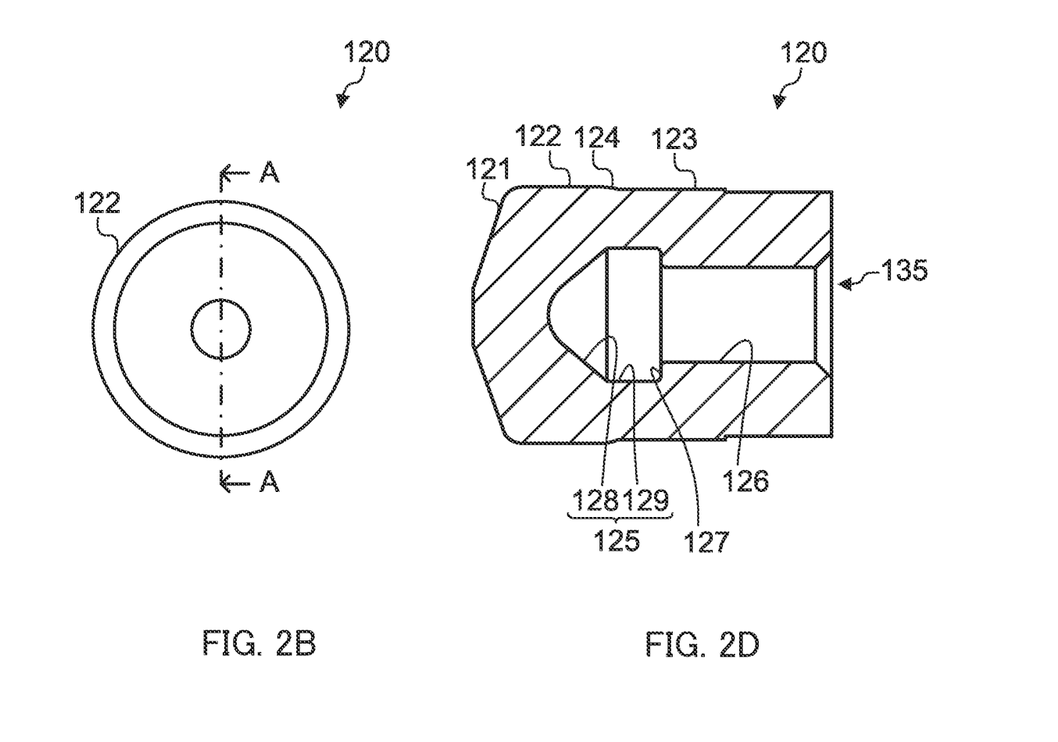
Figure 2C:
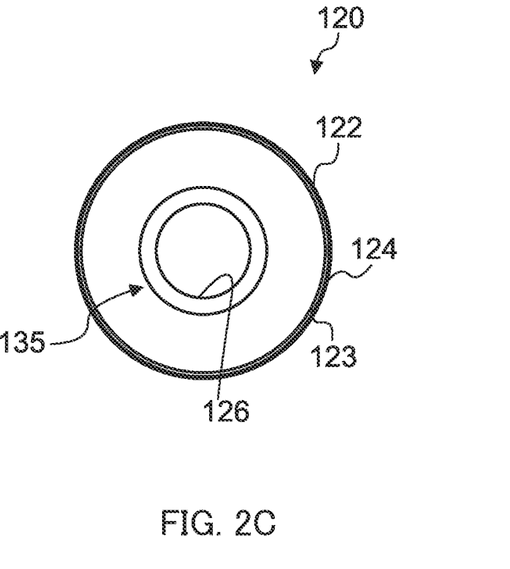

FIG. 1 is a cross-sectional view of a configuration of an instrument according to Embodiment 1 of the present invention. FIGS. 2A to 2D illustrate a configuration of a plunger according to the present embodiment. FIG. 2A is a plan view of the plunger, FIG. 2B is a left side view, FIG. 2C is a right side view, and FIG. 2D is a cross-sectional view taken along a line A-A illustrated in FIG. 2B.

As illustrated in FIG. 1, instrument 100 includes cylindrical member 110 and plunger 120. For example, instrument 100 may be connected to a device such as a microchannel chip or a genetic testing cartridge and injects or suctions fluid, such as gas or liquid, with respect to the device. Instrument 100 is used by inserting pin 130 to recess 135 of plunger 120 and moving plunger 120 with respect to cylindrical member 110. Moving plunger 120 with respect to cylindrical member 110 allows instrument 100 to inject fluid in cylindrical member 110 into the outside (e.g., the device) or suction fluid in the outside (e.g., the device) into cylindrical member 110. In addition, configuring cylindrical member 110 to be a syringe allows instrument 100 to be also used as a part of an injector syringe. In this specification, an end part of plunger 120 on the side where pin 130 is inserted may be referred to as a "base end," whereas the other end part on the opposite side of the base end may be referred to as a "distal end." In FIGS. 1, 2A, and 2D, a left end part is the distal end of plunger 120, whereas a right end part is the base end of plunger 120. FIG. 2B illustrates plunger 120 as seen from the distal end side, and FIG. 2C illustrates plunger 120 as seen from the base end side.

Cylindrical member 110 is a member having a cylindrical shape inside which plunger 120 slides. The shape and size of cylindrical member 110 are not particularly limited as long as the shape is cylindrical, and are appropriately set according to plunger 120. A cross-sectional shape perpendicular to a central axis of cylindrical member 110 may be circular or rectangular. In the present embodiment, the cross-sectional shape is circular. That is, an inner peripheral surface of cylindrical member 110 has a cylindrical side surface shape. The size of the cross-section is preferably the same size in the portion with which an outer peripheral surface of plunger 120 may come into contact. The material of cylindrical member 110 is not particularly limited. Examples of the material of cylindrical member 110 include resin, glass, and metal. Cylindrical member 110 may have a circularly symmetric shape around the central axis while may have another shape other than the circularly symmetric shape. In the present embodiment, cylindrical member 110 has a circularly symmetrical shape around the central axis in a portion with which the outer peripheral surface of plunger 120 may come into contact.

Plunger 120 is attached to a tip of pin 130 and slides inside cylindrical member 110. As illustrated in FIGS. 2A to 2D, plunger 120 includes plunger body 121, first surface 122, second surface 123, outer stepped surface 124, first housing 125, second housing 126, and inner stepped surface 127.

Plunger body 121 is a resin member that has recess 135 opening at the base end and provided for inserting a part of pin 130. Plunger body 121 may be formed such that an outer diameter thereof decreases stepwise toward the base end side from the distal end side, or the outer diameter repeatedly increases and decreases. In the present embodiment, a portion of plunger body 121 that faces the inner peripheral surface of cylindrical member 110 is formed such that the outer diameter thereof decreases stepwise toward the base end side from the distal end side. Examples of the resin forming plunger body 121 include thermoplastic polyurethane, thermoplastic copolyester (TPC), thermoplastic elastomer (TPE), polyimide 612 (PA612), and low-density polyethylene (LDPE). Shore hardness of the resin (JIS K7215) is preferably 95 or less. The material of plunger body 121 may include other additives in addition to the resins described above.

Pin 130 includes head part 131 and shaft part 132. Head part 131 is disposed at a tip of shaft part 132. The shape of head part 131 is not particularly limited and is appropriately set according to first housing 125 of plunger 120. In the present embodiment, head part 131 includes distal end part 133 having substantially triangular pyramid-shape and base end part 134 having cylindrical-shape disposed between distal end part 133 and shaft part 132. Distal end part 133 includes a tapered surface, an outer diameter of which decreases toward the distal end side from the base end side. Shaft part 132 is connected to head part 131 (base end part 134). The shape of shaft part 132 is not particularly limited and is appropriately set according to second housing 126 of plunger 120. In the present embodiment, shaft part 132 is cylindrical. The diameter of shaft part 132 is smaller than the largest diameter of head part 131. Thus, a stepped surface is formed between head part 131 and shaft part 132. Head part 131 of pin 130 is housed in first housing 125 of recess 135 of plunger 120, and a part of shaft part 132 of pin 130 is housed in second housing 126 of recess 135 of plunger 120. Head part 131 of pin 130 is engaged with inner stepped surface 127 of recess 135 of plunger 120; thus, moving pin 130 to the base end side causes plunger 120 to move to the base end side without head part 131 of pin 130 coming off from recess 135 of plunger 120.

First surface 122 of plunger 120 is a surface which is disposed on an outer peripheral surface of plunger body 121 and comes into contact with the inner peripheral surface of cylindrical member 110. First surface 122 may be formed so as to come into contact with the inner surface of cylindrical member 110 when pin 130 is not attached, or may be formed so as not to come into contact with the inner surface of cylindrical member 110 when pin 130 is not attached and so as to come into contact with the inner surface of cylindrical member 110 when pin 130 is attached. In the present embodiment, first surface 122 is in contact with the inner surface of cylindrical member 110 even when pin 130 is not attached. The shape of first surface 122 is preferably a shape complementary to that of the inner surface of cylindrical member 110. In the present embodiment, the shape of first surface 122 has a cylindrical side surface shape.

Second surface 123 is a surface which is disposed on the base end side relative to first surface 122 in the outer peripheral surface of plunger body 121, and an outer diameter thereof is smaller than that of first surface 122. During use, second surface 123 at least partly comes into contact with the inner peripheral surface of cylindrical member 110. Second surface 123 is formed so as not to come into contact with the inner surface of cylindrical member 110 when pin 130 is not attached and so as to come into contact with the inner surface of cylindrical member 110 when pin 130 is attached. The shape of second surface 123 is preferably a shape complementary to that of the inner surface of cylindrical member 110. In the present embodiment, the shape of second surface 123 has a cylindrical side surface shape Outer stepped surface 124 is a surface disposed between first surface 122 and second surface 123 in the outer peripheral surface of plunger body 121. The configuration of outer stepped surface 124 is not particularly limited as long as outer stepped surface 124 can connect between first surface 122 and second surface 123, but is preferably substantially perpendicular to a sliding direction of plunger 120. As described later, a length between the base end of plunger 120 and outer stepped surface 124 may be either longer or shorter than a length between the base end of plunger 120 and a parting line in a mold for molding plunger 120. Moreover, outer stepped surface 124 may be disposed at a position corresponding to the parting line or may be disposed on the distal end side relative to the parting line. In the present embodiment, outer stepped surface 124 is disposed on the distal end side relative to the parting line. Outer stepped surface 124 becomes a part of groove 139 (see FIG. 4) capable of functioning as, for example, an oil groove during use of plunger 120.

First housing 125 is disposed in an area at least partly corresponding to second surface 123 in recess 135 to house a tip part of pin 130 (head part 131). In the present embodiment, first housing 125 is disposed in an area corresponding to outer stepped surface 124 in recess 135. Here, the expression "area corresponding to outer stepped surface 124 in recess 135" refers to the same position as outer stepped surface 124 in the sliding direction of plunger 120 (left-right direction in FIG. 1). The shape of first housing 125 is not particularly limited, but is preferably a shape complementary to that of head part 131 of pin 130. In addition, the size of first housing 125 is preferably smaller in size than head part 131 of pin 130. Forming first housing 125 in this manner allows insertion of the tip part of pin 130 (head part 131) into recess 135 to expand first housing 125 outward, thus, causing first surface 122 and second surface 123 positioned outside thereof to expand outward as well.

First housing 125 includes tapered surface 128 which has an inner diameter thereof decreases toward a distal end side from a base end side, and parallel surface 129 which is disposed on the base end side of tapered surface 128 and which has an inner diameter thereof does not change. Thus, in the present embodiment, a portion of first housing 125 with the largest inner diameter is a portion where parallel surface 129 is disposed. The portion of first housing 125 with the largest inner diameter may be located at a position corresponding to outer stepped surface 124, a position on the base end side relative to the position corresponding to outer stepped surface 124, and/or a position on the distal end side relative to the position corresponding to outer stepped surface 124. In the present embodiment, this portion is located at a position corresponding to outer stepped surface 124.

Second housing 126 is disposed on the base end side relative to first housing 125 in recess 135 to house shaft part 132 of pin 130. Second housing 126 has an inner diameter which is smaller than the largest inner diameter of first housing 125. The shape of second housing 126 is preferably a shape complementary to that of shaft part 132 of pin 130. In the present embodiment, the inner diameter of second housing 126 is smaller than an outer diameter of shaft part 132 of pin 130.

Inner stepped surface 127 is a surface disposed between first housing 125 and second housing 126 in recess 135. Inner stepped surface 127 functions to engage plunger 120 and pin 130 with each other. From the viewpoint of engaging with head part 131 of pin 130, inner stepped surface 127 is preferably substantially perpendicular to the sliding direction of plunger 120. Meanwhile, inner stepped surface 127 will be an undercut shape at the time of molding to be described later. Thus, inner stepped surface 127 will be damaged during mold release when being made excessively large. To prevent this, in the present embodiment, the size of inner stepped surface 127 is set from the viewpoint of engaging plunger 120 and pin 130 with each other, and preventing damage during mold release. In addition, as described later, a length between the base end of plunger 120 and inner stepped surface 127 is preferably longer than the length between the base end of plunger 120 and the parting line in the mold for molding plunger 120. That is, stepped surface 127 inner is preferably disposed on the distal end side relative to the parting line.

A difference between an outer diameter of an end part of first surface 122 on a side of outer stepped surface 124 and an outer diameter of an end part of second surface 123 on a side of outer stepped surface 124 is preferably smaller than a difference between an inner diameter of an end part of first housing 125 on a side of inner stepped surface 127 and an inner diameter of an end part of second housing 126 on a side of inner stepped surface 127. Satisfying this condition allows appropriate release of molds 140 and 240 described later.

(Method of Using Instrument)

Figure 3A:
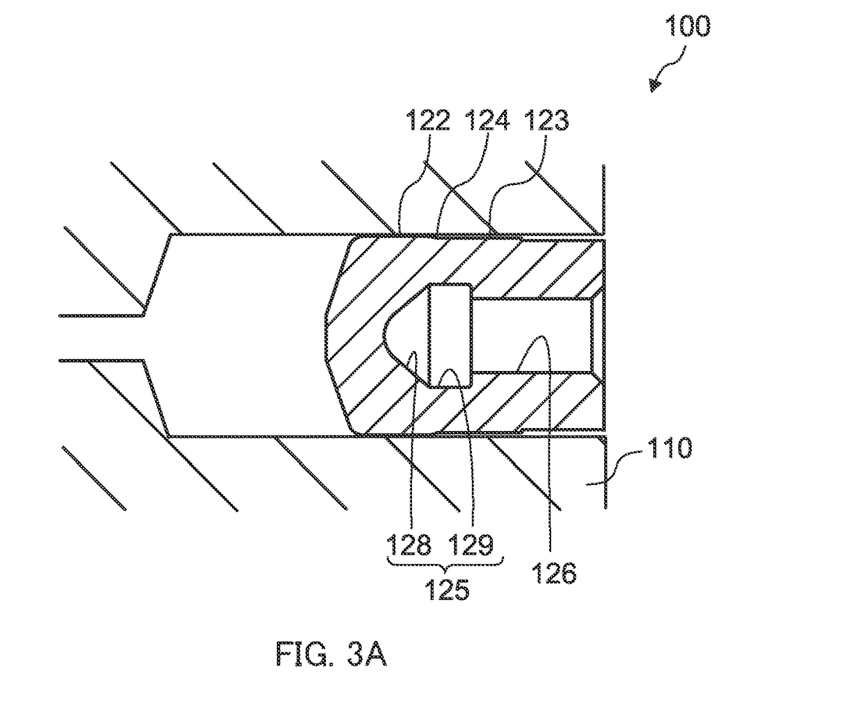
FIGS. 3A and 3B are cross-sectional views for describing a method of using the instrument according to Embodiment 1 of the present invention.
Figure 3B:
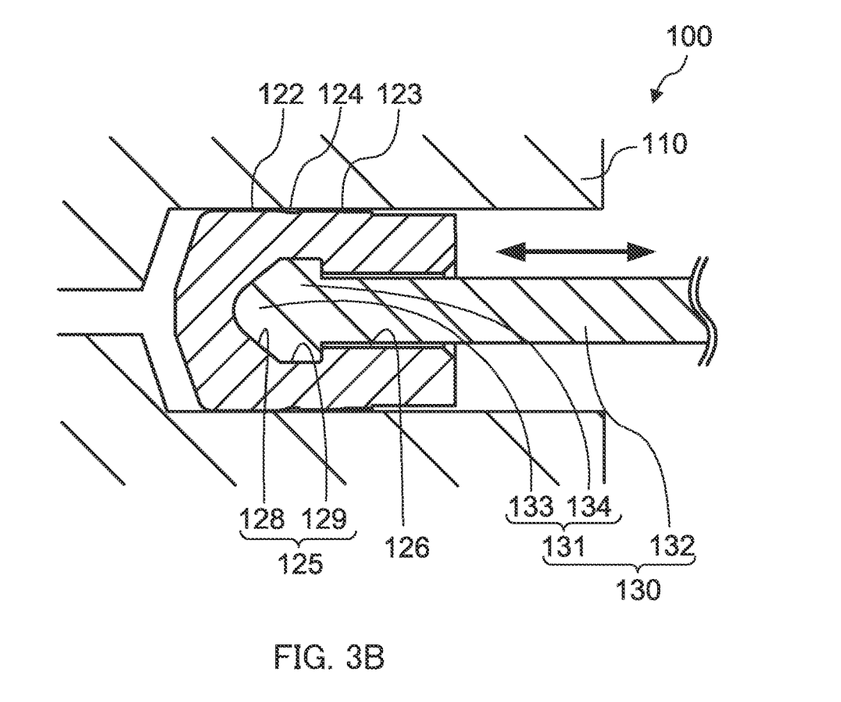
Figure 4:
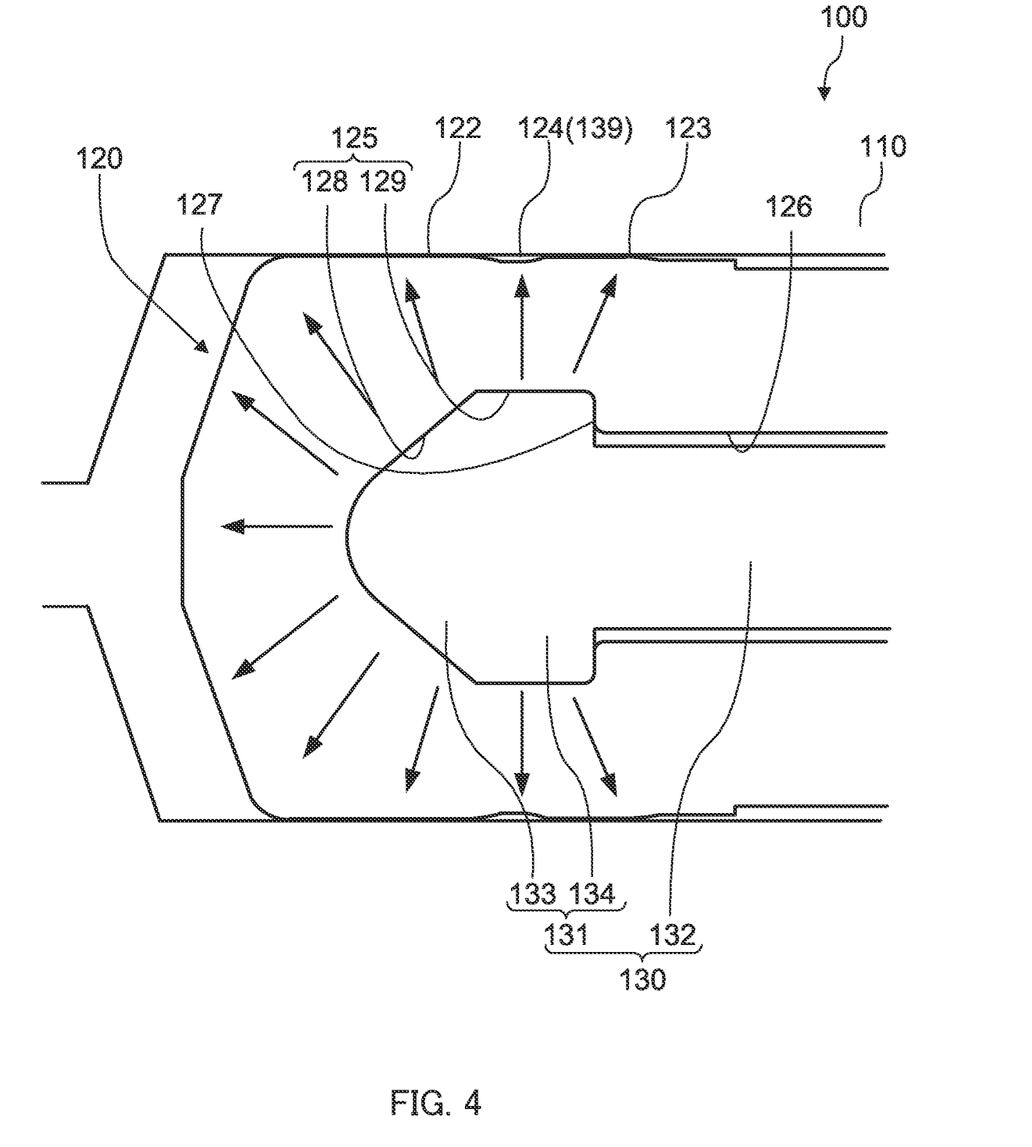
FIG. 4 is a cross-sectional schematic diagram for illustrating a pressing force of a pin against the plunger in a state where the pin is inserted into the plunger.

FIGS. 3A and B are diagrams for describing a method of using instrument 100. FIG. 3A illustrates a state after plunger 120 is inserted into cylindrical member 110 but pin 130 is not inserted yet. FIG. 3B is illustrates a state after pin 130 is inserted into plunger 120. FIG. 4 is a cross-sectional diagram for illustrating a pressing force of pin 130 against plunger 120 in a state where pin 130 is inserted into plunger 120. Note that, in FIG. 4, since the pressing force is illustrated by arrows, hatching of the cross section is omitted.

As illustrated in FIG. 3A, first surface 122 comes into contact with the inner peripheral surface of cylindrical member 110 in a state where plunger 120 is inserted into cylindrical member 110 but pin 130 is not inserted yet. On the other hand, in this state, second surface 123 and outer stepped surface 124 do not come into contact with the inner peripheral surface of cylindrical member 110.

As illustrated in FIGS. 3B and 4, in a state after pin 130 is inserted into plunger 120, head part 131 of pin 130 is housed in first housing 125 of plunger 120, and shaft part 132 of pin 130 is housed in second housing 126 of plunger 120. At this time, since first housing 125 is formed smaller than head part 131, an inner surface of first housing 125 is pressed outward. In the present embodiment, since first housing 125 is disposed in the area corresponding to outer stepped surface 124, outer diameters of a part of first surface 122 and a part of second surface 123 increase, and second surface 123 at least partly comes into contact with the inner peripheral surface of cylindrical member 110. This enhances the seal performance by plunger 120 with cylindrical member 110. On the other hand, even when the inner surface of first housing 125 is pressed outward, outer stepped surface 124 does not come into contact with the inner surface of cylindrical member 110. Thus, groove 139 is formed between first surface 122 and second surface 123. This groove 139 functions as, for example, an oil groove.

(Configuration of Mold)

Figure 5A:
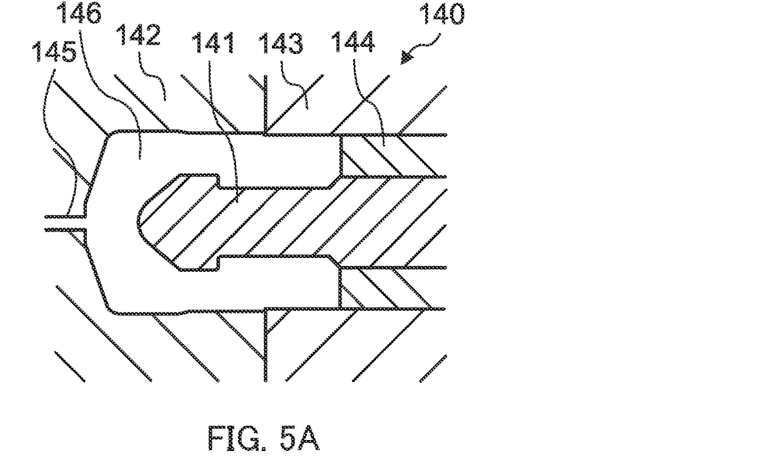
FIGS. 5A, 5B and 5C are cross-sectional views for describing a mold according to Embodiment 1 of the present invention.
Figure 5B:
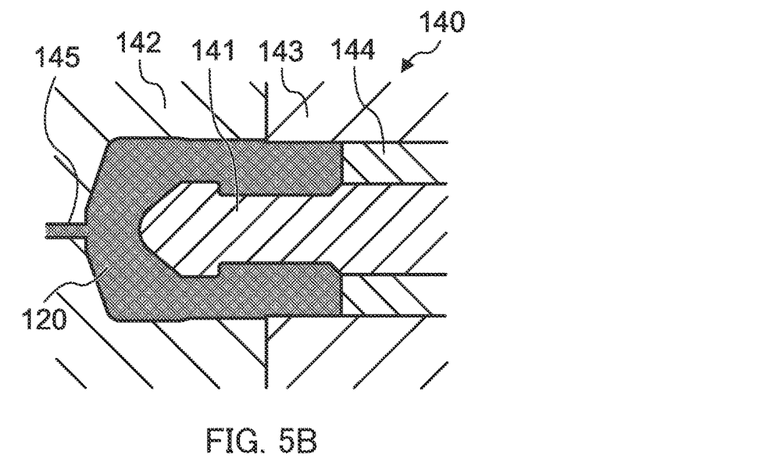
Figure 5C:
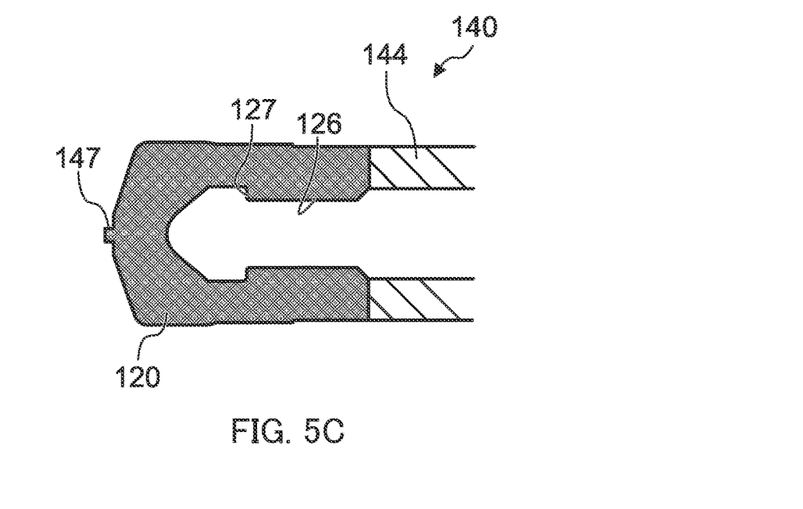

FIGS. 5A to 5C are cross-sectional views for describing mold 140 for producing plunger 120 according to the present embodiment by injection molding.

As illustrated in FIGS. 5A to 5C, mold 140 includes first mold 141, second mold 142, third mold 143, and fourth mold 144. Second mold 142, third mold 143 and fourth mold 144 mold the outside of plunger 120. First mold 141 molds the inside of plunger 120.

First mold 141 is a mold piece for molding recess 135 of plunger 120. First mold 141 has a shape complementary to that of recess 135.

Second mold 142 is a mold piece for molding a distal-end-side portion of the outer peripheral surface of plunger 120. In the present embodiment, second mold 142 molds an outer peripheral surface including first surface 122 and second surface 123. In addition, in the present embodiment, gate part 145 for filling cavity 146 with a material of plunger 120 (e.g., resin in a molten state) is formed in second mold 142. Gate part 145 is formed at a position corresponding to the distal end of plunger 120. Since gate part 145 is formed at a position corresponding to the distal end of plunger 120, gate mark 147 remaining in plunger 120 does not inhibit movement of plunger 120 in cylindrical member 110.

Third mold 143 is a mold piece for molding a base-end-side portion of the outer peripheral surface of plunger 120. In the present embodiment, third mold 143 molds the outer peripheral surface of the base end side relative to second surface 123.

Fourth mold 144 is a mold piece for molding a base end portion of an outer surface of plunger 120.

As illustrated in FIG. 5A, a parting line between second mold 142 and third mold 143 is disposed on the base end side relative to a portion corresponding to the portion which molds first housing 125 of first mold 141. More specifically, in the present embodiment, the parting line is disposed at a position corresponding to a central portion of second housing 126. Here, the expression "a position corresponding to a central portion of second housing 126" refers to the same position as a central portion of second housing 126 in a moving direction first mold 141 (left-right direction in FIG. 5A).

As illustrated in FIG. 5A, plunger 120 which is described above forms cavity 146 whose shape is complementary to that of plunger 120 by clamping first mold 141, second mold 142, third mold 143, and fourth mold 144.

Then, as illustrated in FIG. 5B, cavity 146 is filled with a material of plunger 120 (e.g., molten resin) having fluidity from gate part 145. The material of plunger 120 is then solidified while keeping this state.

As illustrated in FIG. 5C, from plunger 120 obtained by solidifying the material, the gate is cut by a well-known technique (not illustrated), and first mold 141, second mold 142, and third mold 143 are released as appropriate. Thus, plunger 120 can be molded into a highly sealable shape even with a resin that is harder than a rubber by forming the outer diameters of the outer peripheral surface and the stepped surface of the inner peripheral surface thereof at appropriate positions with appropriate dimensions.

FIGS. 6A to 6D are cross-sectional views for describing mold 240 of a variation for producing plunger 120 according to the present embodiment by injection molding. Mold 240 according to the variation is different in positions of mold 140 and the parting line. In the following description, the same configurations as those of mold 140 will be given the same reference signs, and a description thereof will be omitted. Portions different from those of mold 140 will be mainly described.

As illustrated in FIGS. 6A to 6D, mold 240 includes first mold 141, second mold 242, third mold 243, and fourth mold 144. Second mold 242, third mold 243 and fourth mold 144 mold the outside of plunger 120. First mold 141 molds the inside of plunger 120.

Figure 6A:
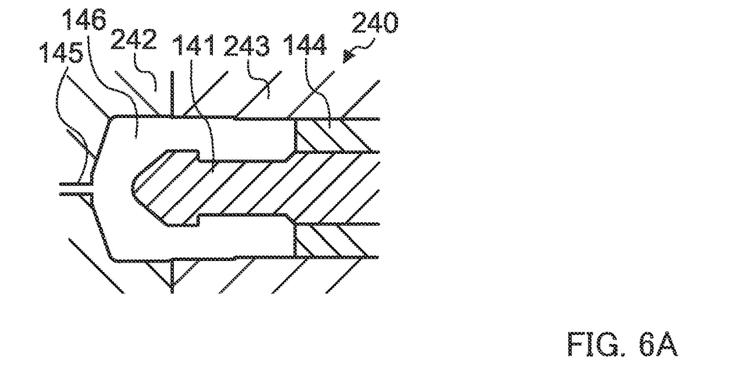
FIGS. 6A, 6B, 6C and 6D are cross-sectional views for describing a mold according to a variation of Embodiment 1 of the present invention.

As illustrated in FIG. 6A, a parting line between second mold 242 and third mold 243 is disposed in a portion corresponding to a portion of first mold 141 which molds first housing 125. More specifically, in the present embodiment, the parting line is disposed at a position corresponding to parallel surface 129 of first housing 125. As illustrated in FIG. 6A, the parting line between second mold 242 and third mold 243 is disposed at the same position as outer stepped surface 124.

As illustrated in FIG. 6A, plunger 120 which is described above forms cavity 146 whose shape is complementary to that of plunger 120 by clamping first mold 141, second mold 242, third mold 243, and fourth mold 144.

Figure 6B:
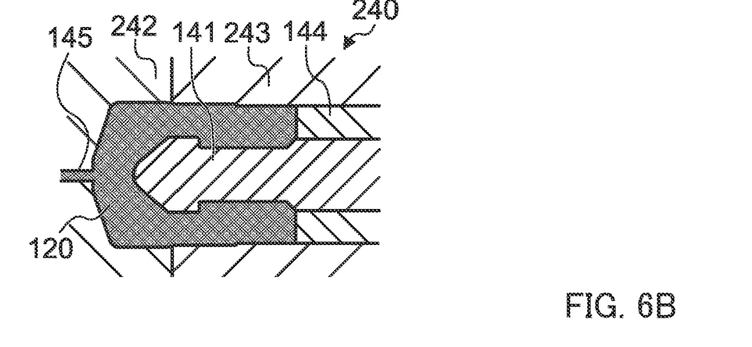

Then, as illustrated in FIG. 6B, cavity 146 is filled with a material of plunger 120 (e.g., molten resin) having fluidity from gate part 145. The material of plunger 120 is then solidified while keeping this state.

Figure 6C:
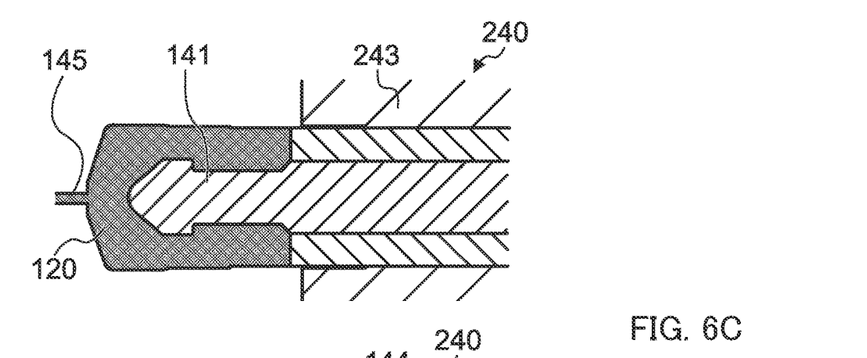
Figure 6D:
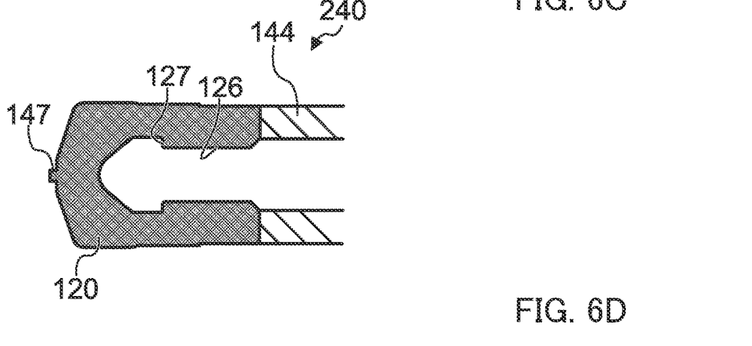

As illustrated in FIGS. 6C and 6D, from plunger 120 obtained by solidifying the material, a gate is cut by a well-known technique (not illustrated), and first mold 141, second mold 242, and third mold 243 are released as appropriate. Thus, plunger 120 can be molded into a highly sealable shape even with a resin that is harder than a rubber by forming the outer diameters of the outer peripheral surface and the stepped surface of the inner peripheral surface thereof at appropriate positions with appropriate dimensions.

(Effects)

As described above, according to the present invention, since a plunger is made of a resin, it is inexpensive, and productivity is high. In addition, the plunger includes a second surface that comes into contact with an inner surface of a cylindrical member only during use and an outer stepped surface that does not come into contact with the inner surface of the cylindrical member; thus, an undercut shape that can be used as an oil groove during use is formed without molding a large undercut shape such as an oil groove. Moreover, since the plunger is subjected to a large pressure only during actual use, no change with time occurs.

Embodiment 2

Instrument 100 according to Embodiment 2 is different from instrument 100 according to Embodiment 1 only in the shape of plunger 220. Thus, in the present embodiment, a configuration of plunger 220 will be mainly described whereas the same configurations as those of instrument 100 according to Embodiment 1 will be given the same reference signs, and a description thereof will be omitted.

(Configurations of Instrument and Plunger)

Figure 7A:
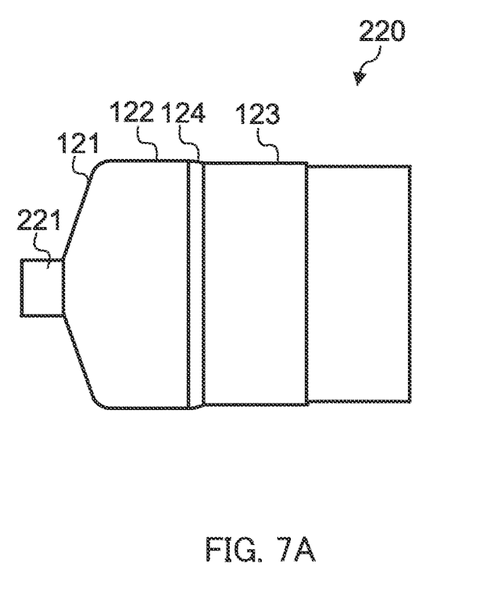
FIGS. 7A, 7B, 7C and 7D are cross-sectional views of a configuration of a plunger according to Embodiment 2 of the present invention.
Figure 7B:
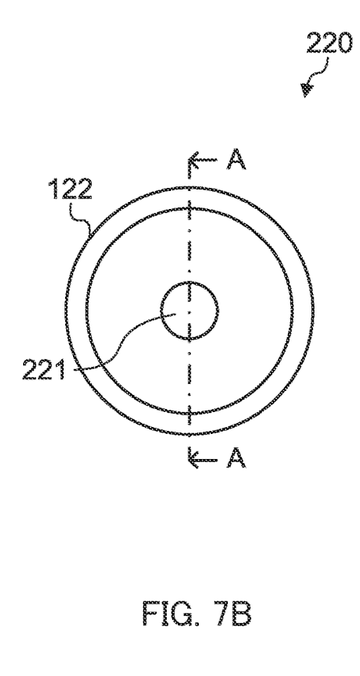
Figure 7C:
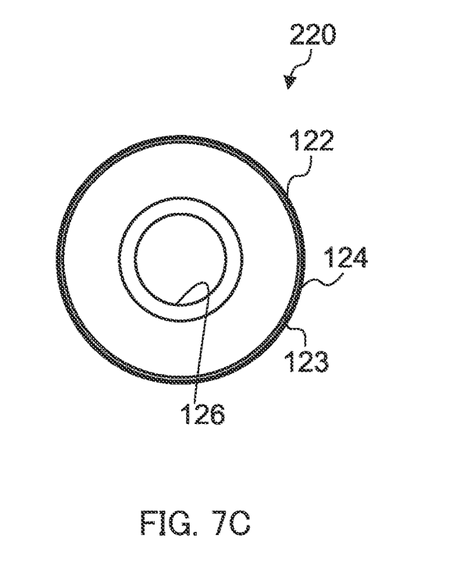
Figure 7D:
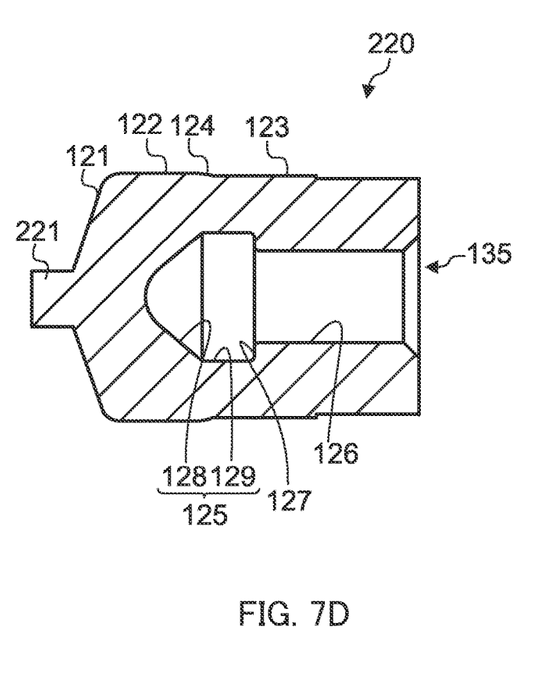

FIGS. 7A to 7D illustrate a configuration of a plunger according to Embodiment 2 of the present invention. FIG. 7A is a plan view of the plunger, FIG. 7B is a left side view, FIG. 7C is a right side view, and FIG. 7D is a cross-sectional view taken along a line A-A illustrated in FIG. 7B.

An instrument according to the present embodiment includes cylindrical member 110 and plunger 220. Cylindrical member 110 is the same as in Embodiment 1; thus, a description thereof will be omitted.

As illustrated in FIGS. 7A to 7D, plunger 220 includes plunger body 121, first surface 122, second surface 123, outer stepped surface 124, first housing 125, second housing 126 and inner stepped surface 127, as well as protrusion 221.

Plunger body 121 includes protrusion 221 in addition to recess 135. Protrusion 221 is a protrusion for feeding fluid inside cylindrical member 110 into a device. The shape of protrusion 221 is not particularly limited as long as it has a shape complementary to that of connecting channel 231 between the device and cylindrical member 110 (see FIG. 1). In the present embodiment, the shape of protrusion 221 is a cylindrical shape. Thus, in the instrument of the present embodiment, for example, when the fluid inside cylindrical member 110 is fed into the device, the fluid remaining in connecting channel 231 between the device and cylindrical member 110 can also be fed into the device.

Although not particularly illustrated, in the present embodiment, a gate mark is formed at a tip of protrusion 221.

(Effects)

In the present embodiment as described above, in addition to the effects of Embodiment 1, it is possible to suppress remaining of the fluid inside connecting channel 231.

In plungers 120 and 220 of Embodiments 1 and 2, one outer stepped surface 124 (groove 139) is provided, but there may be a plurality of outer stepped surfaces 124 (grooves 139). For example, assuming that the outer diameter of shaft part 132 of pin 130 is made larger than the inner diameter of second housing 126. In this case, a surface between second surface 123 and the surface on the base end side relative to second surface 123 also becomes second outer stepped surface 124. Moreover, after pin 130 is inserted, the surface on the base end side relative to second surface 123 at least partly comes into contact with the inner peripheral surface of cylindrical member 110. Thus, groove 139 is formed also at a position corresponding to second outer stepped surface 124 during use.

In addition, in plungers 120 and 220 of Embodiments 1 and 2, inner stepped surface 127 is continuously formed so as to surround recess 135, but inner stepped surface 127 is only required to prevent plungers 120 and 220 from remaining on a side of second mold 142 at the time of above-described molding and from coming off during use. For example, inner surfaces of parallel surface 129 and second housing 126 may be formed to be a continuous curved surface, and a plurality of protrusions may be arranged between parallel surface 129 and second housing 126. In this case, tip side surfaces of these protrusions function as inner stepped surface 127.

Embodiment 3

An instrument according to Embodiment 3 is different from instrument 100 according to Embodiment 1 only in the shape of plunger 320. Thus, in the present embodiment, a configuration of plunger 320 will be mainly described whereas the same configurations as those of instrument 100 according to Embodiment 1 will be given the same reference signs, and a description thereof will be omitted.

(Configurations of Instrument and Plunger)

Figure 8A:
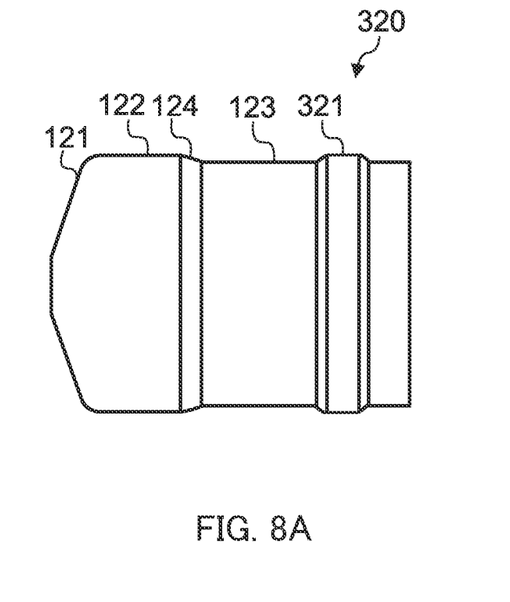
FIGS. 8A, 8B, 8C and 8D are cross-sectional views of a configuration of a plunger according to Embodiment 3 of the present invention.
Figure 8B:
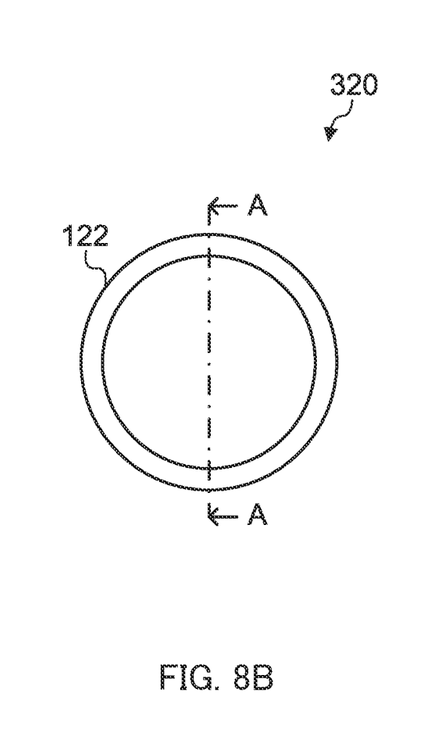
Figure 8C:
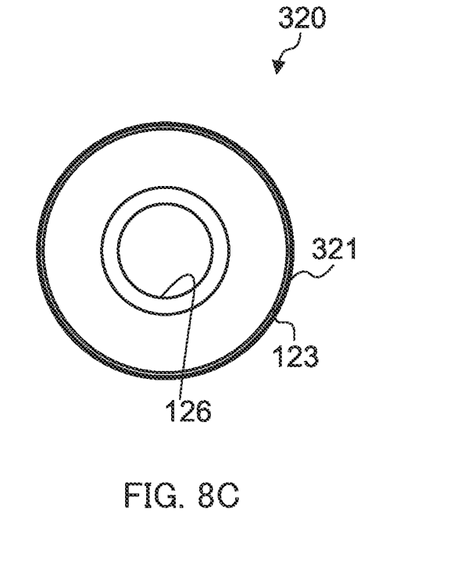
Figure 8D:
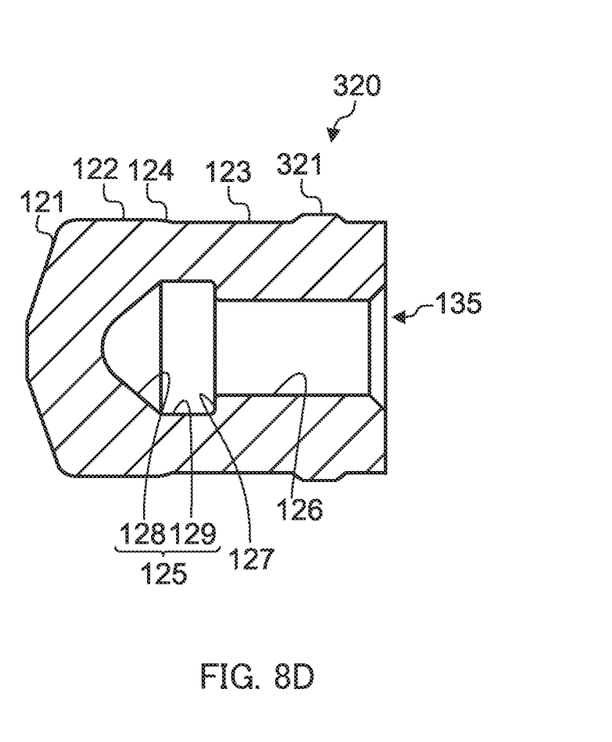

FIGS. 8A to 8D illustrate a configuration of plunger 320 according to Embodiment 3 of the present invention. FIG. 8A is a plan view of plunger 320, FIG. 8B is a left side view, FIG. 8C is a right side view, and FIG. 8D is a cross-sectional view taken along a line A-A illustrated in FIG. 8B.

An instrument according to the present embodiment includes cylindrical member 110 and plunger 320. Cylindrical member 110 is the same as in Embodiment 1; thus, a description thereof will be omitted.

As illustrated in FIGS. 8A to 8D, plunger 320 includes plunger body 121, first surface 122, second surface 123, outer stepped surface 124, first housing 125, second housing 126, inner stepped surface 127, and ring part 321.

Ring part 321 prevents leakage of oil (grease) to the base end side. Ring part 321 comes into contact with the inner peripheral surface of cylindrical member 110 after plunger 320 is inserted into cylindrical member 110 but pin 130 is not inserted yet. The shape of ring part 321 is not particularly limited as long as it can exhibit the above-described function. The shape of ring part 321 is substantially trapezoidal in a cross section including an axis along the central axis of plunger body 121. Besides, ring part 321 may be either smoothly or roughly connected to second surface 123. In the present embodiment, ring part 321 and second surface 123 are smoothly connected with each other. Ring part 321 is preferably disposed on the base end side relative to inner stepped surface 127. Placing ring part 321 on the base end side relative to inner stepped surface 127 enables effective prevention of the oil (grease) leakage.

(Effects)

As described above, in the present embodiment, in addition to the effects of Embodiment 1, oil (grease) leakage to the base end side can be prevented.

Embodiment 4

An instrument according to Embodiment 4 is different from instrument 100 according to Embodiment 1 only in the shape of plunger 420. Thus, in the present embodiment, a configuration of plunger 420 will be mainly described whereas the same configurations as those of instrument 100 according to Embodiment 1 will be given the same reference signs, and a description thereof will be omitted.

(Configurations of Instrument and Plunger)

Figure 9A:
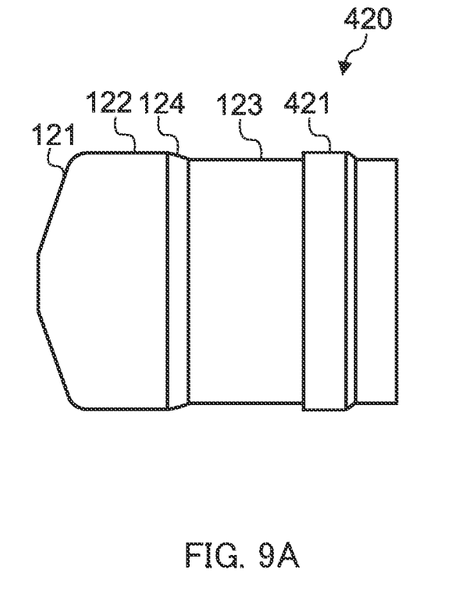
FIGS. 9A, 9B, 9C and 9D are cross-sectional views of a configuration of a plunger according to Embodiment 4 of the present invention.
Figure 9B:
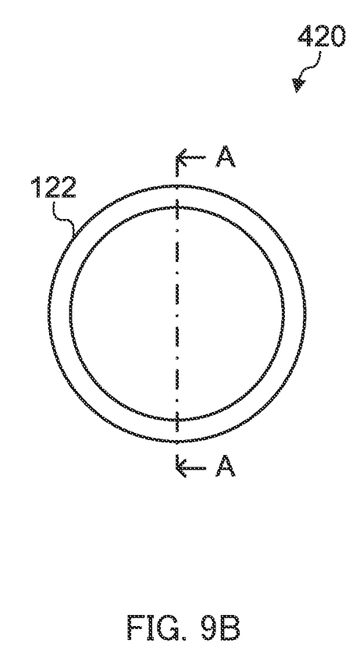
Figure 9C:
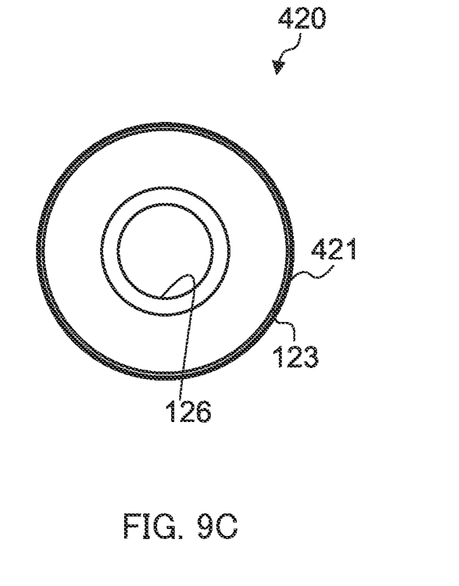
Figure 9D:
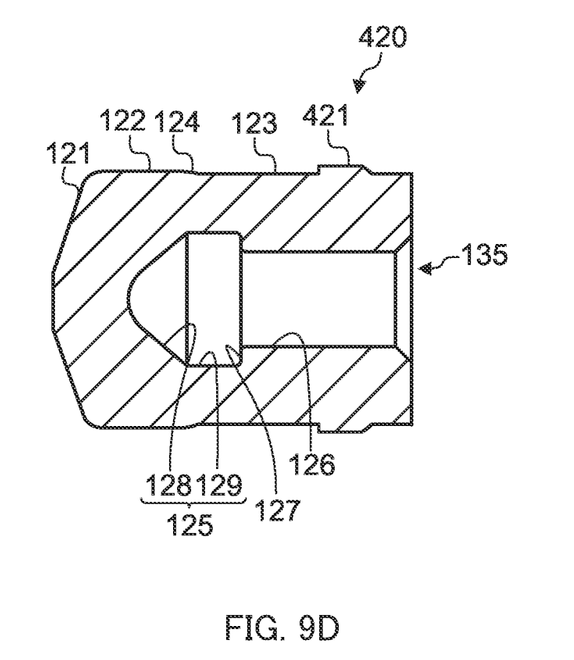

FIGS. 9A to 9D illustrate a configuration of plunger 420 according to Embodiment 4 of the present invention. FIG. 9A is a plan view of plunger 420, FIG. 9B is a left side view, FIG. 9C is a right side view, and FIG. 9D is a cross-sectional view taken along a line A-A illustrated in FIG. 9B.

An instrument according to the present embodiment includes cylindrical member 110 and plunger 420. Cylindrical member 110 is the same as in Embodiment 1; thus, a description thereof will be omitted.

As illustrated in FIGS. 9A to 9D, plunger 420 includes plunger body 121, first surface 122, second surface 123, outer stepped surface 124, first housing 125, second housing 126, inner stepped surface 127, and ring part 421.

Ring part 421 prevents leakage of oil (grease) to the base end side. Ring part 421 comes into contact with the inner peripheral surface of cylindrical member 110 after plunger 420 is inserted into cylindrical member 110 but pin 130 is not inserted yet. The shape of ring part 421 is not particularly limited as long as it can exhibit the above-described function. The shape of ring part 421 is substantially trapezoidal in a cross section including an axis along the central axis of plunger body 121. Besides, ring part 421 may be either smoothly or roughly connected to second surface 123. In the present embodiment, ring part 421 and second surface 123 are roughly connected with each other. In addition, in the present embodiment, a side surface on a tip side of ring portion 421 is disposed at a position corresponding to a parting line. More specifically, the side surface on the tip side of ring portion 421 is disposed so as to be substantially perpendicular to a sliding direction of plunger 420. The side surface on the tip side of ring portion 421 can be thus molded by using the parting line. Hence, the oil (grease) is efficiently scraped off when plunger 420 is inserted into cylindrical member 110 and slides in the sliding direction (left-right direction in FIG. 9D); as a result, the oil (grease) leakage can be more effectively prevented. Note that, ring portion 421 is preferably disposed on the base end side relative to inner stepped surface 127

(Effects)

As described above, in the present embodiment, in addition to the effects of Embodiment 1, leakage of oil (grease) to the base end side can be prevented. Furthermore, as compared with plunger 320 in Embodiment 3, plunger 420 in the present embodiment can more effectively prevent oil (grease) leakage to the base end side.

INDUSTRIAL APPLICABILITY

The plunger and instrument of the present invention can be applied, for example, to the injecting and suctioning of fluids for microchannel chips, genetic inspection cartridges, and the like.

REFERENCE SIGNS LIST

100 Instrument
110 Cylindrical member
120, 220, 320, 420 Plunger
121 Plunger body
122 First surface
123 Second surface
124 Outer stepped surface
125 First housing
126 Second housing
127 Inner stepped surface
128 Tapered surface
129 Parallel surface
130 Pin
131 Head part
132 Shaft part
133 Distal end part
134 Base end part
135 Recess
139 Groove
140, 240 Mold
141 First mold
142, 242 Second mold
143, 243 Third mold
144 Fourth mold
145 Gate part
146 Cavity
147 Gate mark
221 Protrusion
231 Connecting channel
321, 421 Ring part

The invention claimed is:

1. A plunger configured to be attached to a tip of a pin and to slide inside of a cylindrical member, the plunger comprising:
a plunger body made of a resin and including a recess that opens at a base end, the recess being provided for inserting a part of the pin;
a first surface disposed on an outer peripheral surface of the plunger body and configured to come into contact with an inner peripheral surface of the cylindrical member;
a second surface disposed on a base end side relative to the first surface in the outer peripheral surface of the plunger body, the second surface having an outer diameter that is smaller than that of the first surface;
an outer stepped surface disposed between the first surface and the second surface in the outer peripheral surface of the plunger body;
a first housing disposed in an area in the recess, at least a part of the area being at a same position as the second surface in a sliding direction of the plunger, the first housing being provided for housing the tip part of the pin;
a second housing disposed on the base end side relative to the first housing in the recess, the second housing having an inner diameter that is smaller than a largest inner diameter of the first housing;
an inner stepped surface disposed between the first housing and the second housing in the recess; and
a ring part disposed on the outer peripheral surface of the plunger body, a portion of the ring part being located on a base end side relative to a same position as the inner stepped surface in the sliding direction of the plunger;
wherein an outer diameter of the first surface is smaller than the outer diameter of the ring part.

2. The plunger according to claim 1, wherein
a difference between an outer diameter of an end part of the first surface on a side of the outer stepped surface and an outer diameter of an end part of the second surface on a side of the outer stepped surface is smaller than a difference between an inner diameter of an end part of the first housing on a side of the inner stepped surface and an inner diameter of an end part of the second housing on a side of the inner stepped surface.

3. The plunger according to claim 1, wherein
a portion of the first housing with the largest inner diameter is located at a same position as the outer stepped surface in the sliding direction of the plunger or on a base end side relative to the same position as the outer stepped surface in the sliding direction of the plunger.

4. The plunger according to claim 1, wherein
the first housing is disposed in an area in the recess, the area being same position as the outer stepped surface in the sliding direction of the plunger.

5. The plunger according to claim 1, wherein
the first housing includes a tapered surface having an inner diameter that decreases toward a distal end side from a base end side.

6. The plunger according to claim 1, wherein
the plunger body includes a portion that faces the inner peripheral surface of the cylindrical member, the portion having an outer diameter that decreases stepwise toward a base end side from a distal end side.

7. The plunger according to claim 1, wherein the plunger body includes thermoplastic polyurethane.

8. An instrument for injecting or suctioning a fluid, the instrument comprising:
- a cylindrical member; and
- a plunger configured to be attached to a tip of a pin and to slide inside of the cylindrical member,
- wherein the plunger includes:
  - a plunger body made of a resin and including a recess that is open at a base end, the recess being provided for inserting a part of the pin;
  - a first surface disposed on an outer peripheral surface of configured to come into contact with an inner peripheral surface of the cylindrical member;
  - a second surface disposed on a base end side relative to the first surface in the outer peripheral surface of the plunger body, the second surface having an outer diameter that is smaller than that of the first surface;
  - an outer stepped surface disposed between the first surface and the second surface in the outer peripheral surface of the plunger body;
  - a first housing disposed in the same position as the outer stepped surface in the recess in the sliding direction of the plunger, the first housing being provided for housing a tip part of the pin;
  - a second housing disposed on the base end side relative to the first housing in the recess, the second housing having an inner diameter that is smaller than a largest inner diameter of the first housing;
  - an inner stepped surface disposed between the first housing and the second housing in the recess, and
  - an outer diameter of a part of the second surface increases when the part of the pin is inserted into the recess,
- wherein in a state where the part of the pin is inserted into the recess, at least a part of the first surface and at least a part of the second surface come into contact with the inner peripheral surface of the cylindrical member while the outer stepped surface does not come into contact with the inner peripheral surface of the cylindrical member.

9. The instrument according to claim 8, further comprising the pin which is inserted into the recess.

* * * * *